US012429815B2

(12) United States Patent
Bosch et al.

(10) Patent No.: US 12,429,815 B2
(45) Date of Patent: Sep. 30, 2025

(54) METHOD FOR COOLING DOWN A PRINTER, PRINTER AND SOFTWARE PRODUCT

(71) Applicant: Canon Production Printing Holding B.V., Venlo (NL)

(72) Inventors: Rudolf Bosch, Venlo (NL); Albert G. M. Van Welie, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 18/751,947

(22) Filed: Jun. 24, 2024

(65) Prior Publication Data

US 2025/0013195 A1 Jan. 9, 2025

(30) Foreign Application Priority Data

Jul. 6, 2023 (EP) .................................... 23183941

(51) Int. Cl.

| | |
|---|---|
| ***G03G 15/00*** | (2006.01) |
| ***G03G 15/16*** | (2006.01) |
| ***G03G 21/20*** | (2006.01) |

(52) U.S. Cl.

CPC ........... *G03G 21/20* (2013.01); *G03G 15/161* (2013.01); *G03G 15/168* (2013.01); *G03G 15/50* (2013.01); *G03G 15/5054* (2013.01); *G03G 21/206* (2013.01); *G03G 2215/1647* (2013.01); *G03G 2215/1652* (2013.01); *G03G 2221/0005* (2013.01)

(58) Field of Classification Search

CPC .... G03G 15/161; G03G 15/168; G03G 15/50; G03G 15/5045; G03G 15/5054; G03G 21/20; G03G 21/206; G03G 2215/1647; G03G 2215/1652; G03G 2215/1661; G03G 2221/0005; B41J 2002/012

See application file for complete search history.

(56) References Cited

U.S. PATENT DOCUMENTS

| | | | | |
|---|---|---|---|---|
| 2006/0045560 | A1 | 3/2006 | Van Sas | |
| 2019/0001662 | A1* | 1/2019 | Takeuchi | B41J 2/0057 |
| 2020/0019092 | A1* | 1/2020 | Shiran | G03G 15/161 |
| 2020/0047517 | A1* | 2/2020 | Kogure | B41J 2/16517 |

FOREIGN PATENT DOCUMENTS

| | | | |
|---|---|---|---|
| EP | 3431292 | A1 | 1/2019 |
| JP | 3726511 | B2 | 12/2005 |
| JP | 2006-91101 | A | 4/2006 |

OTHER PUBLICATIONS

Search Report issued in European priority application 23183941, dated Nov. 14, 2023.

* cited by examiner

*Primary Examiner* — Sophia S Chen

(74) *Attorney, Agent, or Firm* — Birch, Stewart, Kolasch & Birch, LLP

(57) ABSTRACT

A method for shutting down a printer that includes an endless cleaning member and an endless image transfer member includes a step of cooling down the printer by allowing the cleaning member and the cleaning zone to cool down to a predetermined cooling temperature, the predetermined cooling temperature being a temperature lower than the elevated temperature; and during cooling down of the cleaning member and the transfer zone to the predetermined cooling temperature, continuing the surface of the cleaning member being in moving contact with the surface of the image transfer member in the cleaning zone.

5 Claims, 2 Drawing Sheets

METHOD FOR COOLING DOWN A PRINTER, PRINTER AND SOFTWARE PRODUCT

FIELD OF THE INVENTION

The present invention relates to a method for cooling down a printer comprising an endless cleaning member and an endless image transfer member. The invention further relates to a printer comprising an endless cleaning member and an endless image transfer member The invention further relates to a software product.

BACKGROUND OF THE INVENTION

Image reproduction systems, such as printers and copiers, often include an image transfer device having an image transfer member, usually in the form of a belt or a drum, for receiving on its surface a toner in image form and for subsequently transferring these images of toner in a transfer zone to a recording medium, such as paper. In an operative state, the image transfer member is urged against a counter member in the transfer zone while the recording medium passes therebetween. The transfer may take place by means of pressure, or heat, or heat and pressure each of them optionally assisted by electrostatic forces and/or vibrational forces. The toner must be fixed onto the receiving material in order to render the images permanent. By applying an appropriate amount of pressure and heat in the transfer zone, transfer and fixing take place simultaneously. Otherwise a subsequent fixing step is to be executed. For example, this may be done by feeding the recording medium, onto which the unfixed toner is already deposited, through a fixing zone where an increased temperature and pressure serve to fix the image permanently to the recording medium. In such image transfer devices, contaminants e.g. in the form of residual toner and/or debris originating from the recording medium and/or other impurities may build up on the surface of the image transfer member. For instance when the recording medium is paper or a like fibrous material, debris in the form of dust and fibres may build up on the image transfer member surface in the region of the transfer zone. If these contaminants remain on the image transfer member surface, the efficiency of the image transfer and the quality of the fixing where applicable, may be affected. Hence, it is desirable to clean the image transfer member surface.

It is known to provide an endless cleaning member having a tacky substance on its surface and being positioned downstream of the transfer zone for removing contaminants from the image transfer member surface when being engaged in contact therewith.

When the image reproduction system shuts down, heating of parts may be stopped, resulting in cooling down of the printer parts. If the cleaning member cools down, the tacky substance on the surface of the cleaning member may become hard. Further, during the cooling down process, the tacky material may migrate to one part of the surface of the cleaning member, for example under influence of gravity. This may result in an uneven distribution of tacky substance on the cleaning member surface after shutting down the image reproduction system. Further, the mass of tacky substance may have sharp edges. If the image reproduction system is restarted and the cleaning member comes into contact with image transfer member, the image transfer member may be damaged. This is unwanted.

It is therefore an object of the invention to provide a method for shutting down an image reproduction system that does not result in damage of the image transfer member upon restarting the system. It is a further object of the invention to provide a corresponding reproduction system.

SUMMARY OF THE INVENTION

The invention is achieved in a method for cooling down a printer, the printer comprising:

- an endless image transfer member for receiving consecutive images of toner on its surface, the image transfer member being urged, in printing state of the transfer device, into moving contact with a counter member to form a transfer zone therebetween for transferring the respective consecutive images to respective sheets of a recording medium fed consecutively through the transfer zone;
- an endless cleaning member having, in a printing state of the image transfer device, a surface in moving contact with the surface of the image transfer member in a cleaning zone downstream of the transfer zone, the surface of the cleaning member carrying a layer of tacky substance;

wherein in the printing state the endless cleaning member and the cleaning zone having an elevated temperature, the method for cooling down the printer comprising the steps of:

- allowing the cleaning member and the cleaning zone to cool down to a predetermined cooling temperature, the predetermined cooling temperature being a temperature lower than the elevated temperature;
- during cooling down of the cleaning member and the transfer zone to the predetermined cooling temperature, continue the surface of the cleaning member being in moving contact with the surface of the image transfer member in the cleaning zone.

The image transfer member may be in the form of a drum or a belt and may be heated. In case the image transfer member is a belt a first and second backing roller may be provided, the first backing roller cooperating with the cleaning member to form the cleaning zone through which the belt passes, the second backing roller contacting the back of the image transfer belt opposite the counter member such that in the transfer zone both the belt and the recording medium pass while pressure is exerted on at least one of the second backing roller and the counter member to define the contact.

The image transfer member typically has an outer layer of a silicone elastomer. The counter member typically has an outer layer of a silicone elastomer, or a PTFE, or a fluororubber.

The cleaning member usually is a cleaning roller, although also a cleaning web may be used. The cleaning roller is located downstream of the transfer zone and upstream of any intermediate transfer zone where images of toner are transferred to the image transfer member directly from an image forming member or indirectly via one or more further image transfer members. The kind of toner and image forming member which is used depends on the imaging technique used. Examples of imaging techniques include electrography including electrophotography, and magnetography. Examples of toner include ink, dry particulate toner, and liquid toner. For instance in case of electrophotography, the toner may be a dry particulate toner, while the image forming member is a drum or a belt with a photoconductive outer layer whereon a latent image is formed and subsequently developed with toner.

The tacky surface layer material and the cleaning substance can be formed of polymeric material having good adhesive and adsorptive properties, especially at the operating temperatures of the image transfer member. Preferably, the cleaning substance comprises a polymer having a glass transition temperature below the temperature of the image transfer member at the cleaning zone. Such polymeric material may be toner, as a toner typically comprises a thermoplastic binder consisting of a thermoplastic resin or mixture of resins including colouring matter, e.g. carbon black or colouring material such as finely dispersed pigments or soluble dyes. Optionally, the colouring material may be a magnetic pigment, such as, but not limited to, iron oxide. The toner used as cleaning substance may be one of the toners used for rendering the images. Alternately, it is also possible to use toner of a different composition as a cleaning substance, for example containing a lower level of colouring material, or even no colouring material at all.

The cleaning zone may be heated. The cleaning zone as well as the cleaning member may have an elevated temperature. The elevated temperature is selected such, that the tacky substance is deformable to allow proper functioning of the cleaning member.

The printer may be operated in a number of operation modes. The operation modes may include a plurality of operation modes, including, but not limited to a start-up mode, a printing mode, a stand-by mode and a cool down mode. The modes of operation may also be referred to as start-up state, a printing state, a stand-by state and a cool down state.

In the printing state, the printer may print images onto a recording medium. The image transfer member as well as the cleaning member may be at an elevated temperature. Optionally, the printer may be operated in a stand-by mode. In the stand-by mode, the printing may not produce printed images. In the stand-by mode, the image transfer member as well as the cleaning member may be at an elevated temperature, like in the printing mode.

In the start-up state, the printer may be prepared for the printing mode. The transfer member as well as the cleaning member may be heated to an elevated temperature. In the cool down state, the printer may cool down after the printing mode. In the cool down state, the image transfer member and the cleaning member may be allowed to cool down. Active heating of these parts may be stopped. Optionally, the parts may be actively cooled, for example using a fan. In the cool down state, the temperature of the printer parts may hence decrease. The temperature may be decreased to a cooling temperature. The cooling temperature may be a temperature at which the tacky substance will no longer migrate under the circumstances in the printer.

Once the cleaning member and the cleaning zone have reached the cooling temperature, the moving contact between the cleaning member and the image transfer member may be stopped. The printer may then be safely restarted. Re-starting of the printer may be done immediately or after a waiting period.

In an embodiment, the printer comprises a first image transfer member and a second image transfer member. The two image transfer members may be configured to, in a printing mode, simultaneously print an image on a respective side of a recording medium. Together, the two image transfer members may provide both sides of a recording medium with a printed image.

The printer may comprise a first endless cleaning member and a second endless cleaning member, wherein each cleaning member has, in a printing state of the image transfer device, a surface in moving contact with the surface of the respective image transfer member in a cleaning zone downstream of the transfer zone.

In an embodiment of the invention, the cleaning member is a rotatable cleaning roller having a surface with a plurality of spaced-apart perforations therein for discharging any contaminants and excess cleaning substance assembled on the cleaning roller surface into a cavity in the cleaning roller. For instance, the perforations may be in the form of grooves. An advantage thereof is that building up on the cleaning member surface of any excess tacky substance possibly mixed with contaminants is prevented. The cleaning roller may be constructed of a metal such as steel or aluminium. The cleaning roller may however also be made of other heat-resistant material to the extent comporting with the operating temperature thereof. Such heat-resistant materials May include heat-resistant plastics. Optionally a perforated conformable layer may be provided on the cleaning member core material. In any case, the tacky layer is formed on the cleaning member outer surface.

In a further aspect of the invention a printer is provided, the printer comprising:

- an endless image transfer member for receiving consecutive images of toner on its surface, the image transfer member being urged, in printing state of the transfer device, into moving contact with a counter member to form a transfer zone therebetween for transferring the respective consecutive images to respective sheets of a recording medium fed consecutively through the transfer zone;
- an endless cleaning member having, in a printing state of the image transfer device, a surface in moving contact with the surface of the image transfer member in a cleaning zone downstream of the transfer zone, the surface of the cleaning member carrying a layer of tacky substance;
- a control unit configured to control the printer to perform a method according to the present invention.

The printing apparatus is thus configured to perform the method according to the present invention.

In a further aspect of the invention, a software product is provided, the software product comprising program code on a non-transitory machine-readable medium, wherein the program code, when loaded into the control unit of a printer with at least an endless image transfer member, and an endless cleaning member, causes the printer to perform a method according to the present invention.

BRIEF DESCRIPTION OF THE DRAWINGS

The present invention will become more fully understood from the detailed description given herein below and the accompanying drawings which are given by way of illustration only, and thus are not limitative of the present invention, and wherein.

In the drawing, same reference numerals refer to same elements.

DETAILED DESCRIPTION OF THE PREFERRED EMBODIMENTS

Figure 1:
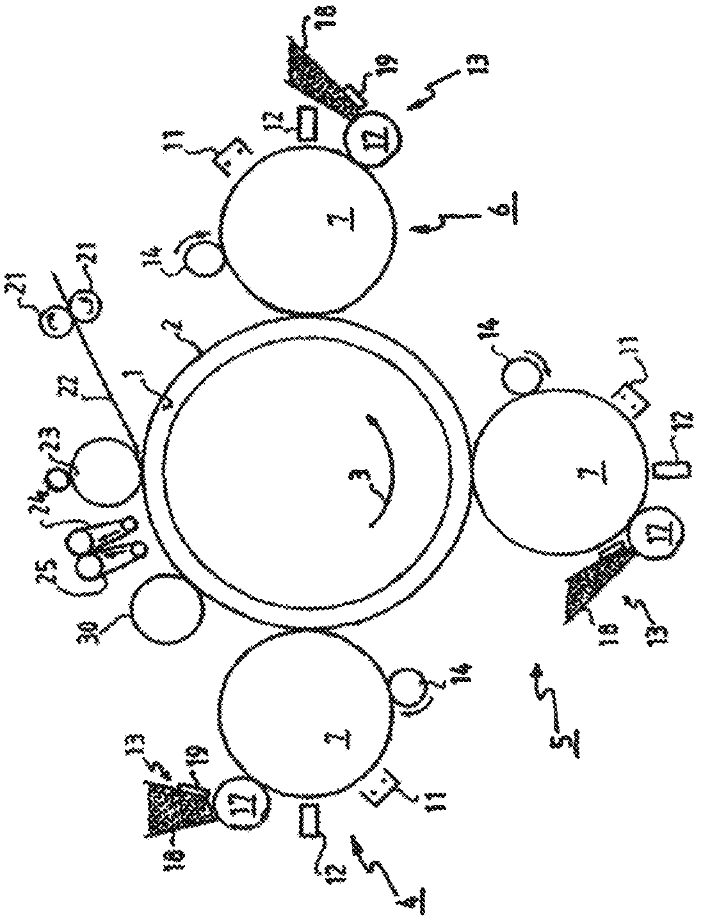
FIG. 1 shows a schematic view of a printing system in which a method according to the invention may be used.

The present invention will now be described with reference to the accompanying drawing, wherein the same reference numerals have been used to identify the same or similar elements throughout the several views.

A printing system capable of printing on sheets of a recording medium is depicted in FIG. 1. The printing system comprises an image transfer member, which can be moved cyclically. The image transfer member is an endless member, such as e.g. a drum or a belt. In this case the image transfer member is a cylindrical drum (1), which can be moved in the direction of arrow (3). The image transfer member is constructed of a metal sleeve, e.g. aluminium, with an elastomeric covering (2). Optionally, the image transfer member may be provided with an outer layer of silicone rubber, e.g. by means of coating. One or more process colours are available on the printing system dependent whether it concerns a monochrome or a multi-colour printing system. For each process colour, an image forming unit (4)(5)(6) is disposed along the path of rotation of the intermediate transfer member. Each of these image forming units comprises a cylindrical image forming member (7) on which a colour separation image of the corresponding process is formed. In an operative state, the image forming members are all in pressure contact with the image transfer member, the force with which the image forming members are pressed against the image transfer member being at maximum 1000 N per linear meter, e.g. 250 N per linear meter.

Each image forming member is formed of a metal drum with a photo-conductive outer layer thereon, the various image forming devices being positioned along the circumference of the image forming member. These image forming devices comprise a charging device (11), e.g. a corona device, an exposing device (12), e.g. a LED array, for image-wise exposure of the photo-conductive surface to thereby form a latent charge image thereon, a development device (13) for developing the latent image with toner, a cleaning device (14) for removing any residual toner present on the image forming member after transfer of the developed separation image to the image transfer member. The development device is in this case a magnetic brush development device which comprises a magnetic roller (17) consisting of a rotatable sleeve with a stationary magnet system therein. The magnetic roller is positioned along the circumference of the image forming member with its surface at short distance from the image forming member surface without contacting it. A reservoir (18) with electrically conductive magnetically attractable dry particulate toner is positioned near the surface of each of the magnetic rollers (17). Each reservoir contains toner in one of the process colours. A stripper (19) is provided at each reservoir to ensure that an even layer of particulate toner is applied to the sleeve of the magnetic roller.

Also disposed along the path of rotation of the image transfer member (1) is a rotatable counter roller (23) which is selectively movable towards and away from the image transfer member surface with controlled pressure. Means (not shown) are provided to drive this counter member. When pressing the counter member against the image transfer member surface a transfer zone is defined through which in operation sheets of recording medium are passed using feed means and sheet discharging means. This feed means consists of co-operating conveyor rollers (21) and a guide plate (22). The sheet discharging means includes co-operating conveyor belts (24) (25).

Further disposed along the path of rotation of the image transfer member (1) downstream of the transfer zone is a rotatable cleaning roller having a tacky surface.

The cleaning roller (30) may be driven by drive means (not shown) and is selectively movable into and out-of an operative position in which the cleaning member surface is in contact with the image transfer member surface. A helical perforation is formed in the cleaning roller surface and extends to a cavity within the roller for discharging any contaminants and/or excess cleaning substance assembled on the roller surface therein. This helical perforation defines in the axial direction an alternating pattern of grooves and non-perforated areas, referred to as dams. Although these parameters are not that critical, the width and pitch of the perforation is of importance as they determine the ratio between the cleaning area and the non-cleaning area of the roller. As cleaning is only performed in the dam area and not in the grooves, proper consideration should be given when determining these parameters. A large cleaning area is desirable but account should be taken of the fact that the contaminants and/or excess cleaning substance assembled on the cleaning roller surface dams must be able to reach the grooves. Hence, for instance the viscosity of the cleaning substance should be involved in this consideration. A position sensor (not shown) is provided to detect the axial position and optionally also the radial position of the cleaning roller as well as control means (also not shown) for controlling the position of the cleaning roller responsive to the detected position.

The tackiness of the surface layer of the cleaning roller may be improved and the viscosity of the layer may be adjusted by heating the surface layer upstream of the cleaning zone. To enable this, a heating device may be provided for heating the cleaning substance on the cleaning roller surface to render the surface tacky prior to contact thereof with the transfer member surface. The heating device may be in the form of a lamp located in the inner core of the roller. Alternatively, especially when the cleaning roller has a conformable surface, external heating is preferred, for example by use of an external radiant heat source. Ideally, means are provided for controlling the heating of the toner particles, for example by the use of a heat sensor to sense the temperature of the cleaning member surface, this sensor being coupled to a control device for the heating device. Heating the toner particles on the cleaning roller surface has several benefits. The heating device can be energized selectively to control the temperature and tackiness of the cleaning roller surface. This is especially beneficial at start up where, in the absence of such a heating device, it would take a significant amount of time (and possibly wastage of receiving material) before the temperature equilibria would be reached.

Figure 2:
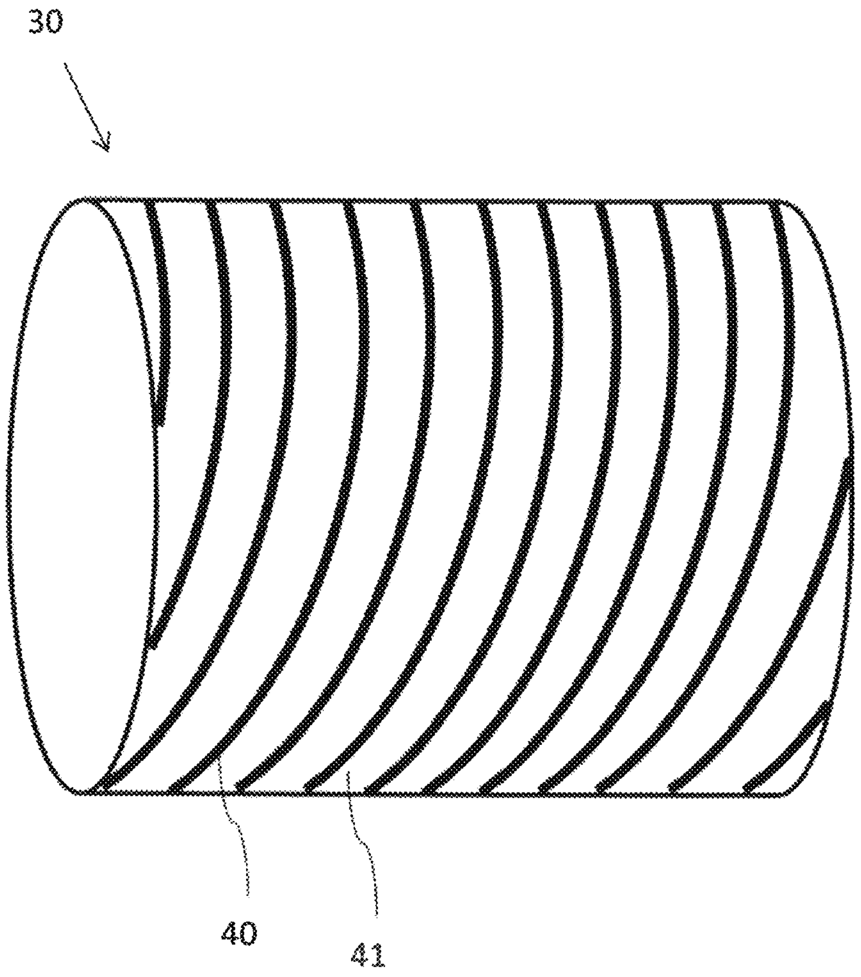
FIG. 2 shows a perspective view of a first example of a cleaning roller.

FIG. 2 shows a perspective view of a first example of a cleaning roller. The cleaning roller is a rotatable cleaning roller. The rotatable cleaning roller has a surface 41 with a plurality of spaced-apart perforations 40 therein.

In operation, in order to reproduce an image a sequence of printing signals is generated. Responsive to this sequence of printing signals the printing system sequentially forms the respective separation images of toner of the corresponding process colour on the respective image forming members (7). In the respective pressure contact zones, the respective separation images are sequentially transferred in register to the image transfer member to thereby form a registered multi-colour image thereon. The toner substance is toner in dry particulate form. The registered multi-colour toner image on the image transfer member is heated by means known per se so that the toner softens and is rendered tacky. The printing system is such that the respective separation images of toner particles are formed complementary. This means that toner particles of a process colour are accumulated on the free surface of the image-carrying member and substantially not on coloured toner particles already accumulated on the image-carrying member. Substantially not means that any superimposed toner particles of different process colours may not lead to visual deficiencies, i.e. visual with the naked human eye, in the finally printed image.

The printing system subsequently transfers the registered multi-colour toner image to a sheet of a recording medium which is controllably fed at the appropriate time by the conveyor rollers (21) through the transfer zone defined by establishing pressure contact between the rotating image transfer member and the rotating counter member. The sheet carrying the printed image is subsequently discharged by the co-operating conveyor belts (24) and (25). The image transfer member is further advanced towards the cleaning zone where any contaminants present on its surface may be removed by transferring them to the tacky surface of the rotating cleaning roller (30). When printing consecutive images, e.g. a document of several pages and/or plural copies of a single image or document, the printing job is defined such that the consecutive images are printed each on separate sheets fed in consecution through the transfer zone. Hence, for consecutive images both an inter-image area, being the area between consecutive images carried on the image transfer member, can be defined as well as an inter-sheet area, being the distance between the associated consecutive sheets. The part of the inter-image area coinciding with the inter-sheet area is referred to as the non-image area.

During cooling down of the machine, the cleaning roller (30) may be kept in the operative position in which cleaning roller (30) surface is in contact with the image transfer member surface. The cleaning roller (30) may rotate and the image transfer member (1) may rotate as well. The rotation may continue until a cooling temperature has reached. A temperature sensor (not shown) may be provided to measure the temperature.

The invention claimed is:

1. A method for shutting down a printer, the printer comprising:

an endless image transfer member for receiving consecutive images of toner on its surface, the image transfer member being urged, in printing state of the printer, into moving contact with a counter member to form a transfer zone therebetween for transferring the respective consecutive images to respective sheets of a recording medium fed consecutively through the transfer zone;

an endless cleaning member having, in a printing state of the printer, a surface in moving contact with the surface of the image transfer member in a cleaning zone downstream of the transfer zone, the surface of the cleaning member carrying a layer of tacky substance;

wherein in the printing state the endless cleaning member and the cleaning zone having an elevated temperature, the method for shutting down the printer comprising the steps of:

cooling down the printer, by allowing the cleaning member and the cleaning zone to cool down to a predetermined cooling temperature in a shutting down procedure, the predetermined cooling temperature being a temperature lower than the elevated temperature;

during cooling down of the cleaning member and the transfer zone to the predetermined cooling temperature, maintaining a continuous moving contact between the surface of the cleaning member and the surface of the image transfer member in the cleaning zone.

2. The method according to claim 1, wherein the cleaning member is a rotatable cleaning roller having a surface with a plurality of spaced-apart perforations therein.

3. The method according to claim 1, wherein the tacky substance comprises toner.

4. A printer comprising:

an endless image transfer member for receiving consecutive images of a toner on its surface, the image transfer member being urged, in printing state of the printer, into moving contact with a counter member to form a transfer zone therebetween for transferring the respective consecutive images to respective sheets of a recording medium fed consecutively through the transfer zone;

an endless cleaning member having, in a printing state of the printer, a surface in moving contact with the surface of the image transfer member in a cleaning zone downstream of the transfer zone, the surface of the cleaning member carrying a layer of tacky substance;

a control unit configured to control the printer to perform a method according to claim 1.

5. A software product comprising program code on a non-transitory machine-readable medium, wherein the program code, when loaded into a controller of a printer with at least an endless image transfer member, and an endless cleaning member, causes the printer to perform a method according to claim 1.

* * * * *